(No Model.)
H. J. WHITE.
JOURNAL AND BUSHING.
No. 318,065. Patented May 19, 1885.
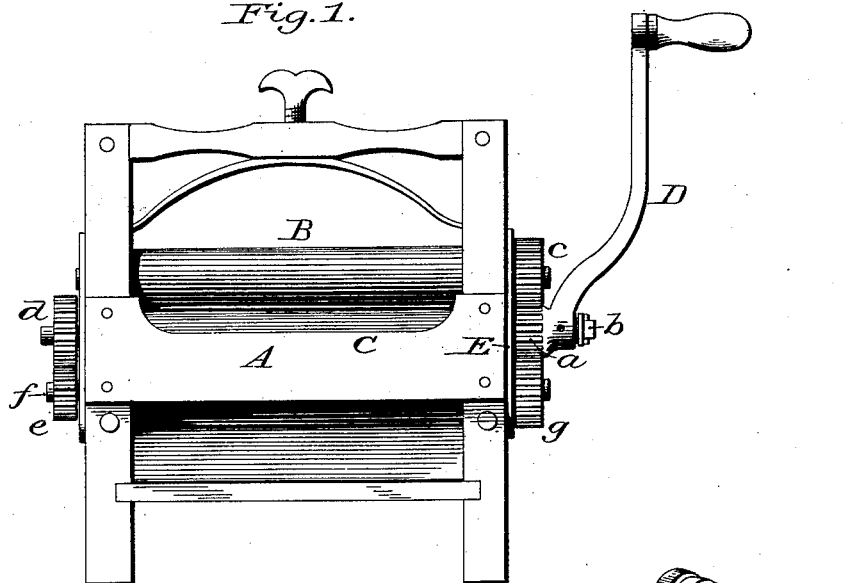
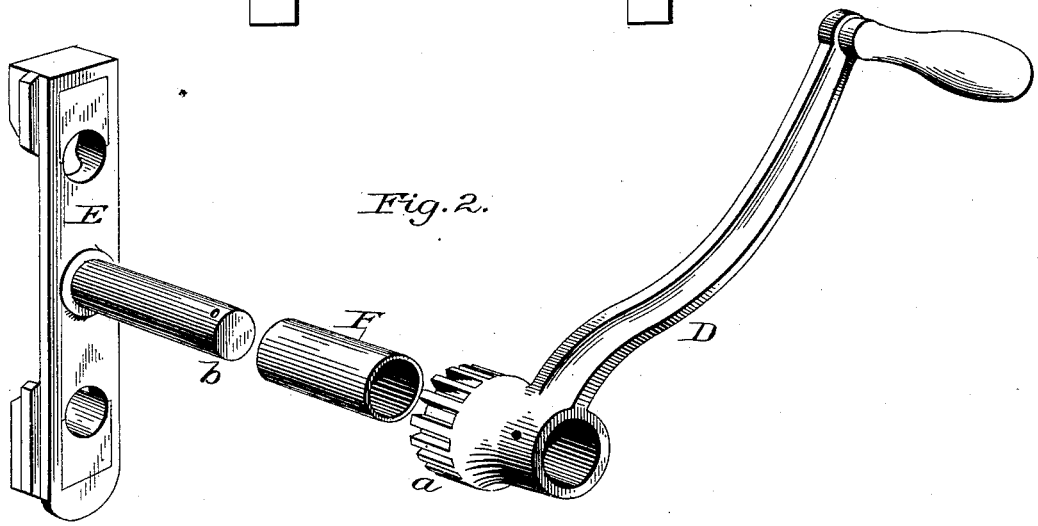
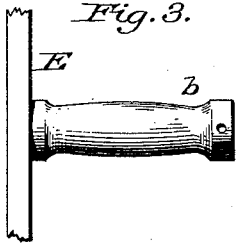
Witnesses:
Jas. F. Duhamel
Walter S. Dodge
Inventor:
Henry J. White,
by Dodge & Son,
his Attys.

UNITED STATES PATENT OFFICE.

HENRY J. WHITE, OF AUBURN, NEW YORK, ASSIGNOR TO THE EMPIRE WRINGER COMPANY, OF SAME PLACE.

JOURNAL AND BUSHING.

SPECIFICATION forming part of Letters Patent No. 318,065, dated May 19, 1885.

Application filed February 27, 1885. (No model.)

*To all whom it may concern:*

Be it known that I, HENRY J. WHITE, of Auburn, in the county of Cayuga and State of New York, have invented certain new and useful Improvements in Journals and Bushings, of which the following is a specification.

This invention relates to that class of clothes-wringing machines in which the operating handle or crank is carried by a stud or axle projecting from the frame of the machine; and the invention consists in a removable sleeve or bushing interposed between the axle and the sleeve or hub of the crank to prevent the rapid wear of the axle and to permit compensation to be quickly made for such wear as may occur.

Figure 1 is a face or front view of a wringer having my improved bushing; Fig. 2, a perspective view showing the handle and the bushing drawn off the axle; Fig. 3, a view of the axle as it appears after wear under prior construction.

In wringers of the description mentioned the axle or stud is found to wear into a curved form, highest in the middle and lowest at each end of the sleeve or hub of the handle or crank of the machine, as illustrated in Fig. 3. This wear takes place rapidly, and soon impairs the usefulness of the machine, causing the pinions to bind and the wringer to work with a jerky and irregular motion. This wear and the consequent objectionable results I overcome by the construction shown in the drawings, in which—

A indicates the wringer-frame; B C, the rolls, and D the crank or handle for operating the rolls.

The crank has its hub provided with or fashioned into a pinion, $a$, and made tubular or hollow to fit upon a stationary axle or stud, $b$, cast integral with the metal block or frame E, in which the rolls B C have their bearings.

The upper roll is funished with a pinion, $c$, which meshes with pinion $a$ of the crank, and the lower roll is furnished with a pinion, $d$, at the opposite end, which meshes with a pinion, $e$, secured upon a shaft, $f$, running parallel with and beneath said roll, and furnished with a second pinion, $g$, which meshes with and receives motion from pinion $a$ of the crank or handle D. In this way the rolls are caused to travel toward each other or in the same direction at their opposite faces, as is common in such machines.

F indicates a cylindrical sleeve or tubular bushing of a size to fit closely but easily upon the stud or axle $b$, and to fit in like manner within the hub of crank D, so that when the sleeve is applied to the stud or axle and the hub of the crank is placed upon the sleeve the latter may rotate with the crank or the crank may turn upon the sleeve, or, as is generally the case, both motions may occur simultaneously, in which latter case, of course, the sleeve would turn more slowly than the crank. The sleeve or bushing is preferably made of brass, because of the facility with which that material can be fashioned to the required shape and the slight friction occasioned by the working of iron and brass surfaces in contact. With the loose sleeve thus interposed the wearing of the stud or axle is caused to take place equally on all sides and throughout the length of the hub, and by simply replacing a worn sleeve with a new one, which may be done in a moment, the crank and its pinion $a$ may be accurately centered and prevented from tipping or wabbling. In this way the machine may be kept always in perfect working condition at a very trifling expense and with very little attention, as the sleeves need to be removed only at long intervals.

I am aware that journal boxes and bearings are commonly provided with removable "brasses" or bushings, and that I do not claim. The sleeve in the present instance performs an office different from that of the ordinary bushing, since it presents a constantly-changing surface to the points where the wear would otherwise take place most rapidly, and thus cause the wear to be uniform, and because, by moving with but more slowly than the hub of the crank, it greatly reduces the friction and consequent rate of wear.

I am aware that it is not new to interpose a loose sleeve or series of sleeves between a rotating shaft or journal and its box or bearing to reduce friction, and this I do not broadly claim. When such sleeve is combined with or applied to a rotating shaft, however, it is found that, owing to the unequal hardness of the sleeve at different points, to slight roughness, to the presence of grit or dust, or to the binding of the sleeve, the shaft will in a short time wear a seat or depression in the sleeve, and when this happens the sleeve will no longer rotate, but will rapidly wear through at such point.

The sleeve in the particular connection herein set forth performs an office which it is not called upon to perform in connection with an ordinary rotating or rocking journal, because the winch or crank employed in this tends to wear the stud or journal into a convex form, as above explained, and this highly objectionable wear is wholly prevented by the sleeve. By employing the fixed stud within the sleeve instead of a rotary journal I avoid the internal wear mentioned, and the sleeve rotates continuously while the winch or crank is turned, distributing the wear equally over every part of the sleeve and stud.

I claim—

The combination of fixed stud or journal $b$, loose sleeve F, encircling said journal, and crank or winch D, having its hub encircling the sleeve, the sleeve being free to rotate upon the journal, and the crank-hub being free to rotate upon the sleeve, whereby the wearing-faces of the journal, sleeve, and crank are constantly changed and the wear made uniform at all points.

HENRY J. WHITE.

Witnesses:
FRED. B. CHAPMAN,
J. F. HEMENWAY.